United States Patent
Chandnani et al.

(10) Patent No.: US 9,436,449 B1
(45) Date of Patent: Sep. 6, 2016

(54) SCENARIO-BASED CODE TRIMMING AND CODE REDUCTION

(71) Applicant: Microsoft Technology Licensing, LLC, Redmond, WA (US)

(72) Inventors: Dinesh Chandnani, Sammamish, WA (US); Kunal Pathak, Redmond, WA (US); Ritesh Parikh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/727,898

(22) Filed: Jun. 2, 2015

(51) Int. Cl.
*G06F 9/45* (2006.01)
*H04L 29/08* (2006.01)
*G06F 17/30* (2006.01)
*G06F 11/36* (2006.01)
*G06F 9/44* (2006.01)

(52) U.S. Cl.
CPC ....... *G06F 8/4435* (2013.01); *G06F 17/30902* (2013.01); *H04L 67/2842* (2013.01); *G06F 8/71* (2013.01); *G06F 11/3608* (2013.01); *G06F 11/3628* (2013.01); *G06F 11/3636* (2013.01)

(58) Field of Classification Search
CPC .................................................. G06F 8/4435
See application file for complete search history.

(56) References Cited

U.S. PATENT DOCUMENTS

| | | | |
|---|---|---|---|
| 6,151,706 A * | 11/2000 | Lo ........................... | G06F 8/445 717/155 |
| 8,407,321 B2 | 3/2013 | Mickens et al. | |
| 8,595,691 B2 | 11/2013 | Ellen et al. | |
| 8,713,586 B2 | 4/2014 | Kieffer | |
| 8,756,584 B2 | 6/2014 | Zhou | |
| 8,887,127 B2 | 11/2014 | Lee et al. | |
| 9,329,978 B2 * | 5/2016 | Kadishay ............ | G06F 11/3676 |
| 2007/0006037 A1 | 1/2007 | Sargusingh et al. | |
| 2009/0292791 A1 * | 11/2009 | Livshits ................ | G06F 9/4443 717/106 |
| 2010/0180082 A1 | 7/2010 | Sebastian et al. | |
| 2013/0198612 A1 | 8/2013 | Ceze et al. | |

(Continued)

OTHER PUBLICATIONS

Kennedy, R. F. Chow, P. Dahl, SM Liu, R. Lo and M, Streich. "Strength Reduction via SSAPRE", 1998, Springer Berlin Heidelberg. in vol. 1383 of the series Lecture Notes in Computer Science. pp. 144-158.*

(Continued)

*Primary Examiner* — Emerson Puente
*Assistant Examiner* — Erika Kretzmer
(74) *Attorney, Agent, or Firm* — Kevin Sullivan; Kate Drakos; Micky Minhas

(57) ABSTRACT

Debugging and testing are aided by removing portions of software which are not relevant to a particular scenario. Upon replay, scenario behavior occurs. A reduction tool selects a function exercised during the replay, disables it to provide a test version of the software, replays the scenario to the test version to produce a candidate behavior, and compares the candidate behavior to the scenario behavior. When the candidate behavior matches the scenario behavior the tool removes the disabled function, thereby providing a reduced version of the software which is functionally equivalent to the full version but has fewer functions to manage. The tool may also remove unexercised code. Trimming unexercised code and reducing exercised but irrelevant code may be interleaved. Caching, dynamic uniform resource locator mapping, hypertext markup language code refactoring, and/or avoidance of certain random elements may also facilitate exhibiting, testing, or debugging web applications.

20 Claims, 3 Drawing Sheets

(56) References Cited

U.S. PATENT DOCUMENTS

| | | | |
|---|---|---|---|
| 2014/0181591 A1 | 6/2014 | Bijanki et al. | |
| 2014/0283096 A1 | 9/2014 | Neerumalla et al. | |
| 2015/0058675 A1* | 2/2015 | Kadishay ............ | G06F 11/3676 714/38.1 |
| 2015/0143180 A1 | 5/2015 | Dawson et al. | |
| 2015/0143342 A1 | 5/2015 | Chandnani et al. | |

OTHER PUBLICATIONS

Gregor Richards, et al., "Automated Construction of JavaScript Benchmarks", retrieved from <<https://www.cs.purdue.edu/homes/gkrichar/papers/jsbench-tr-2011-04-06.pdf>>, Apr. 6, 2011, 14 pages.

Benjamin Livshits, et al., Doloto: Code Splitting for Network-Bound Web 2.0 Applications, retrieved from <<http://research.microsoft.com/pubs/75107/fse08.pdf>>, Nov. 9, 2008, 11 pages.

"Web session manipulation", retrieved from <<http://www.telerik.com/fiddler/web-session-manipulation>>, Feb. 9, 2014, 5 pages.

"Free web debugging with Fiddler web debugging proxy", retrieved from http://www.telerik.com/fiddler/web-debugging>>, Feb. 9, 2014, 5 pages.

Nima Honarmand, et al., "Replay Debugging: Leveraging Record and Replay for Program Debugging", retrieved from http://dl.acm.org/citation.cfm?id=2665737>>, Jun. 14, 2014, 12 pages.

Zhenyu Guo, et al., "R2: An Application-Level Kernel for Record and Replay", retrieved from <<http://static.usenix.org/event/osdi08/tech/full_papers/guo/guo.pdf>>, Dec. 8, 2008, 16 pages.

Josip Maras, et al., "Identifying Code of Individual Features in Client-Side Web Applications", retrieved from <<http://ieeexplore.ieee.org/xpl/login.jsp?tp=&arnumber=6576749&url=http%3A%2F%2Fieeexplore.ieee.org%2Fstamp%2Fstamp.jsp%3Ftp%3D%26arnumber%3D6576749, 2013, 18 pages.

"Instrumenting Code with tracing-framework by Google", retrieved from http://google.github.io/tracing-framework/instrumenting-code.html>>, Jul. 7, 2013, 14 pages.

"Verifying Code by Using UI Automation", retrieved from <<https://msdn.microsoft.com/en-us/library/dd286726.aspx>>, no later than Jan. 30, 2015, 10 pages.

"Selenium IDE Plugins", retrieved from <<http://www.seleniumhq.org/projects/ide/>>, no later than May 19, 2015, 4 pages.

"ECMAScript", retrieved from <<http://en.wikipedia.org/wiki/ECMAScript>>, May 11, 2015, 9 pages.

"JSCoverage—code coverage for JavaScript", retrieved from <<http://siliconforks.com/jscoverage/>>, no later than Oct. 2, 2012, 3 pages.

"Is there a tool to remove unused methods in javascript?", retrieved from <<http://stackoverflow.com/questions/1167663/>>, Jul. 22, 2009, 2 pages.

"C/C++ gcc & ld—remove unused symbols", retrieved from <<http://stackoverflow.com/questions/6687630/, Jul. 16, 2011, 5 pages.

"Reducing Code Size", retrieved from <<https://msdn.microsoft.com/en-us/library/aa716325(v=vs.60).aspx>>, no later than May 17, 2015, 2 pages.

"What are some refactoring methods to reduce size of compiled code?", retrieved from <<http://stackoverflow.com/questions/662439/>>, Mar. 19, 2009, 4 pages.

\* cited by examiner

SCENARIO-BASED CODE TRIMMING AND CODE REDUCTION

BACKGROUND

Much software is written to be executed in a variety of scenarios, which can be represented and distinguished from one another by the software's output and/or by the different scenarios' respective inputs to the software. In different scenarios the inputs to the software may differ in their values, in their sequence, or both. Different portions of the software may be executed in a given scenario, depending on which inputs are entered by users or otherwise obtained by the software from external sources, or generated within the software, and depending on the sequence in which the software receives the inputs.

In particular, a scenario may involve debugging and/or testing the software against performance, accuracy, ease of use, and/or other requirements to see how the software behaves in response to specified inputs. When software is being debugged or tested, the users and developers of the software tend to focus their attention on the particular portions of the software that execute in the scenario in question. The rest of the software may thus be viewed as irrelevant, or even as a hindrance to the debugging or testing efforts.

SUMMARY

Some embodiments are directed to the technical problem of facilitating debugging or testing by removing portions of software which are not relevant to a particular scenario. Users and developers can thus avoid studying, stepping through, or otherwise operating on currently irrelevant code.

Some embodiments automatically replay a previously recorded scenario to an application, thereby exercising a subset of the application's functions and producing a scenario behavior from the application. At least one dead function is automatically trimmed from the application, namely, a function which was not exercised during the replay, thereby providing a trimmed version of the application. An application function which was exercised during the replay is selected and disabled before an attempt to again replay the previously recorded scenario to the application (with the selected function disabled even though it was exercised in the earlier replay). This attempt produces a candidate behavior from the application. When the candidate behavior matches the scenario behavior the disabled function is removed, thereby providing a trimmed and reduced version of the application. When the candidate behavior does not match the scenario behavior the disabled function is re-enabled and marked as relevant to the scenario, thereby providing a trimmed and reduction-tested version of the application. Note that "trimming" pertains to removal of functions that were not exercised, whereas "reducing" pertains to removal of functions that were exercised but are nonetheless irrelevant to the particular scenario in question.

In some embodiments automatic trimming of dead code is optional, whereas code reduction is performed at least once. For example, one embodiment includes an application residing in a memory and having a plurality of functions; the application has a full version which likely includes code that is not relevant to a particular scenario of interest. A recorded scenario residing in the memory will, upon replay to the full version of the application, produce a scenario behavior log. A reduction tool will, upon execution, (i) identify a particular exercised function, namely, a particular one of the plurality of functions which was exercised during a replay of the scenario, (ii) disable execution of the particular exercised function, thereby providing a test version of the application, (iii) replay the scenario to the test version of the application, thereby producing a candidate behavior log, (iv) compare the candidate behavior log to the scenario behavior log, and (v) when the candidate behavior log matches the scenario behavior log the reduction tool remove the disabled function, thereby providing a reduced version of the application which is functionally equivalent to the full version of the application with respect to the scenario yet has fewer functions than the full version of the application.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Acronyms

Figure 1:
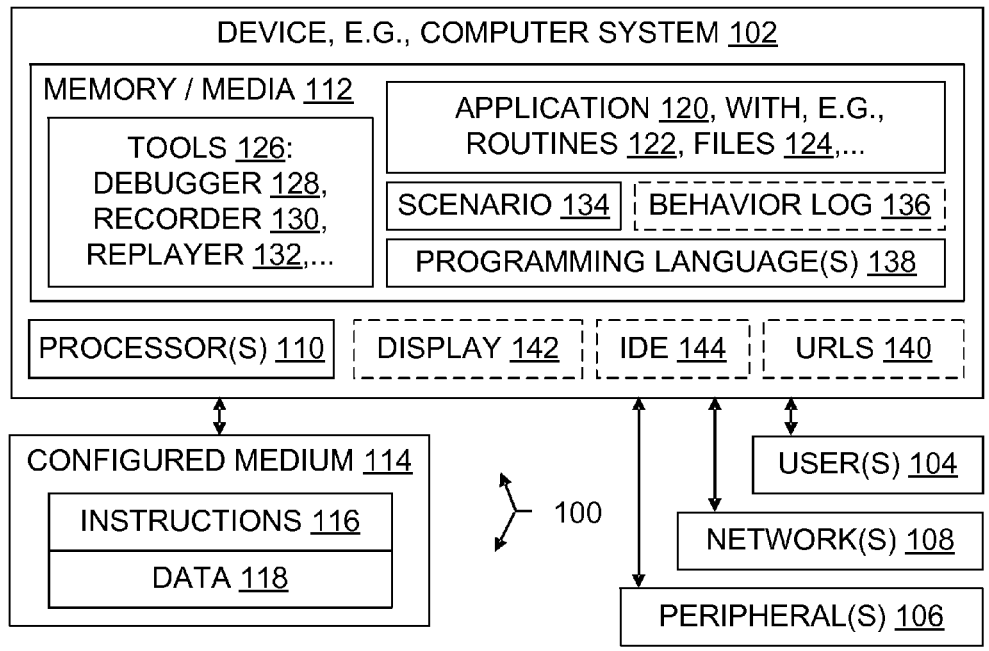
FIG. 1 is a block diagram illustrating a computer system having at least one processor and at least one memory which interact with one another under the control of software for code trimming and reduction, and other items in an operating environment which may be present on multiple network nodes, and also illustrating configured storage medium embodiments.

Some acronyms are defined below, but others may be defined elsewhere herein or require no definition to be understood by one of skill.

ALU: arithmetic and logic unit
API: application program interface
CD: compact disc
CPU: central processing unit
CSS: cascading style sheets
DVD: digital versatile disk or digital video disc
FPGA: field-programmable gate array
FPU: floating point processing unit
GPU: graphical processing unit
GUI: graphical user interface
HTML: hypertext markup language
IDE: integrated development environment, sometimes also called "interactive development environment"
MIME types: internet media types; MIME refers to Multi-purpose Internet Mail Extensions
MPEP: Manual of Patent Examining Procedure RAM: random access memory
RnR: record and replay
ROM: read only memory
URL: uniform resource locator
USPTO: United States Patent and Trademark Office
Note Regarding Hyperlinks Portions of this disclosure contain URLs, hyperlinks, and/or other items which might be considered browser-executable codes. These items are included in the disclosure for their own sake to help describe some embodiments, rather than being included to reference the contents of the web sites that they identify. Applicants do not intend to have these URLs, hyperlinks, or other such codes be active links, and have reformatted most if not all to make them inactive, and reserve the right to reformat any which were overlooked to likewise render them inactive. None of these items are intended to serve as an incorporation by reference of material that is located outside this disclosure document. Thus, there should be no objection to the inclusion of these items herein. The Patent Office will disable these items when preparing this document's text to be loaded onto its official web database. See, e.g., USPTO MPEP §608.01(VII).

Overview

If a web application shows an incorrect or undesired behavior because of a bug or other issue, it is often hard and time consuming for the developer to locate and fix or work around the issue. Such issues may be caused, e.g., by a flaw in a language compiler or a third-party library. Regardless, great difficulty resolving issues in web applications or other code is sometimes due in part to the huge and complex code involved; many programs now have from thousands to hundreds of thousands of lines of source code. Having a smaller amount of code that can still reproduce the issue would make it easy and more efficient for developers to understand, characterize, and resolve issues in large programs. For example, developer time needed may be days instead of weeks, or hours rather than days.

Some embodiments disclosed herein utilize an automation technique to do code reduction of a web application to get a reduced or even minimal code, paring the code down to only that which is involved in reproducing a pre-defined behavior of that web application. For instance, one site reduction tool provides an automated solution that tries to remove all the JavaScript® code that is not needed in a particular scenario to reproduce a particular issue (mark of Oracle America, Inc.). Such tools can save a tremendous amount of time by performing code paring automatically, where manual attempts to pare away code are both tedious, error-prone, and as a practical matter too inefficient to use when an effective automated technique is available. Some tools cache an entire web application, and instrument JavaScript® code, so they can also be utilized for performance analysis of a web application's code. Some examples integrate a Record and Replay utility (RnR) with proxying the web application and using parsing techniques to instrument and reduce uninvolved JavaScript® code while ensuring the application scenario is still reproducible.

Some embodiments described herein may be viewed in a broader context. For instance, concepts such as caching, code coverage, comparison, disabling code, executing code, and removing code may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving caching, code coverage, comparison, disabling code, executing code, and/or removing code are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical problems such as finding code that is relevant to a particular scenario within code designed and implemented to operate in many scenarios. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein track which code is exercised, trim unexercised code, and compare program outputs when previously exercised program code is disabled but not removed. Third, technical effects provided by some embodiments include behavior logs resulting from disabling and possibly also removing elements of code and then replaying inputs from a recorded scenario. Fourth, some embodiments include technical adaptations such as script tags, URL-file mappings, refactored HTML, altered API implementations, and versions of an application which are reduced or reduction-tested. Fifth, technical advantages of some embodiments include improved code manageability, simplified debugging, and/or reduced hardware requirements and faster processing due to reductions in code.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, smartwatches, smartbands, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Optimize" means to improve, not necessarily to perfect. For example, it may be possible to make further improvements in a program which has been optimized.

"Program" is used broadly herein, to include applications, kernels, drivers, interrupt handlers, libraries, and other code written by programmers (who are also referred to as developers).

"Program" is used broadly herein, to include applications, kernels, drivers, interrupt handlers, firmware, state machines, libraries, and other code written by programmers (who are also referred to as developers).

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and SEGWAY® wheeled personal mobility devices (mark of Segway, Inc.). These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

"Reduce", "reduced" and related terms such as "reduction" have a special meaning herein. They indicate the attempted or actual removal of code which was exercised by a scenario replay but is nonetheless not required to reproduce the scenario's outputs and other relevant behavior. "Trimming" refers to removal of code which was not exercised, namely, "dead code". A general term encompassing reducing and/or trimming is "removing". "Paring" is used interchangeably with "removing".

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as altering, attempting, caching, comparing, copying, debugging, disabling, embedding, exercising, identifying, instrumenting, logging, mapping, producing, providing, proxying, recording, reducing, re-enabling, refactoring, removing, replaying, selecting, sending, testing, tracking, trimming, using (and alters, altered, attempts, attempted, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

As another example, a game may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more applications 120 have code with routines 122 and other items, often organized in one or more files 124. Software development tools 126 such as compilers, source code generators, performance profilers, debuggers 128, scenario 134 recorders 130 and replayers 132, for example, assist with software development by producing, exercising, testing, and/or transforming code portions of applications 120. Application behavior during a scenario replay may be viewed in real time as the replay proceeds and/or documented in a log 136. Applications 120 may be implemented in one or more programming languages 138. Web applications 120 often receive and/or transmit URLs 140.

The applications 120, tools 126, and other items shown in the Figures and/or discussed in the text, may each reside partially or entirely within one or more hardware media 112, thereby configuring those media for technical effects which go beyond the "normal" (i.e., least common denominator) interactions inherent in all hardware-software cooperative operation. In addition to processors 110 (CPUs, ALUs, FPUs, and/or GPUs), memory/storage media 112, display(s) 142, and battery(ies), an operating environment may also include other hardware, such as buses, power supplies, wired and wireless network interface cards, and accelerators, for instance, whose respective operations are described herein to the extent not already apparent to one of skill. The display 142 may include one or more touch screens, screens responsive to input from a pen or tablet, or screens which operate solely for output.

A given operating environment 100 may include an Integrated Development Environment (IDE) 144 which provides a developer with a set of coordinated software development tools 126 such as compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with technical endeavors outside the field of software development per se.

One of skill will appreciate that the foregoing aspects and other aspects presented herein under "Operating Environments" may also form part of a given embodiment. This document's headings are not intended to provide a strict classification of features into embodiment and non-embodiment feature classes.

One or more items are shown in outline form in the Figures to emphasize that they are not necessarily part of the illustrated operating environment or all embodiments, but may interoperate with items in the operating environment or some embodiments as discussed herein. It does not follow that items not in outline form are necessarily required, in any Figure or any embodiment. In particular, FIG. 1 is provided for convenience; inclusion of an item in FIG. 1 does not imply that the item, or the describe use of the item, was known prior to the current innovations.

Systems

Figure 2:
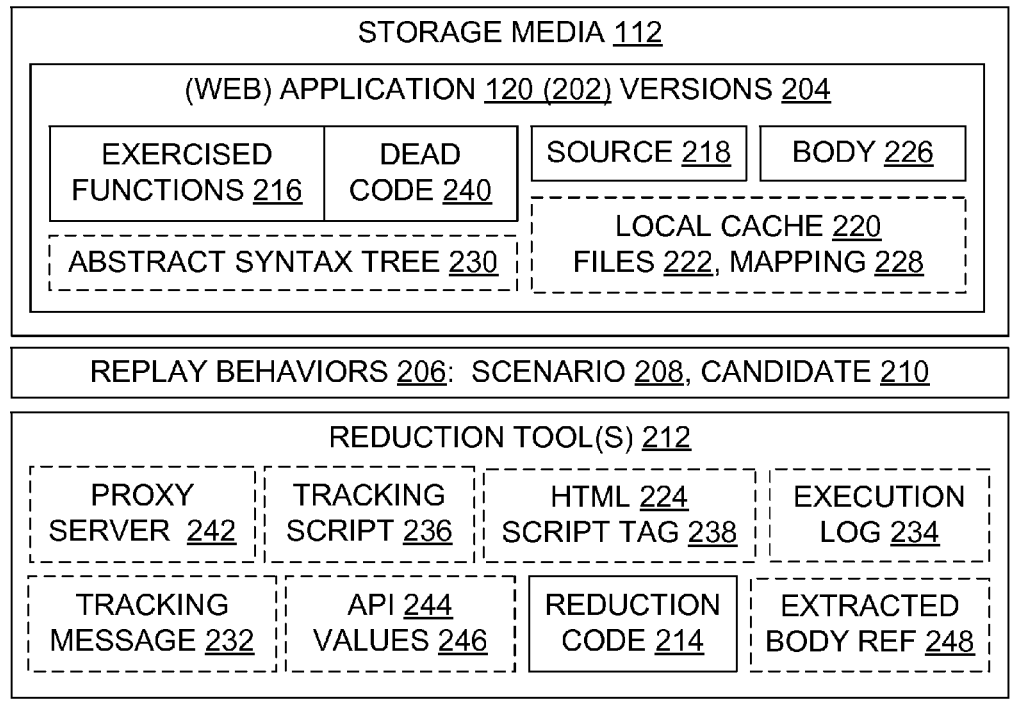
FIG. 2 is a block diagram illustrating aspects of code reduction in an example architecture.

With reference to FIGS. 1 and 2, some embodiments provide a computer system 102 with a logical processor 110 and a memory medium 112 configured by circuitry, firmware, and/or software to provide technical effects such as application code paring directed at technical problems such as reducing developer time and other resources spent storing, running, or inspecting application code that is not relevant to a particular scenario of interest, by extending functionality with reduction tool components as described herein.

In some embodiments, automatic trimming of dead code occurs, while in others it does not, and the system components can vary accordingly. In the examples below, a system is configured to remove application 120 code that was exercised during a replay yet is not required for the scenario 134 of interest. That is, although dead code trimming can be done in a given implementation, it is not required in every implementation.

FIG. 2 further illustrates aspects of an architecture which is suitable for use with some embodiments. A computer system 102 includes a logical processor 110, and a memory 112 in operable communication with the logical processor. An application 120 residing in the memory, which may be for example a web application 202, has a plurality of functions 122. The application 120 has various versions 204, including a full version, which may also be considered a baseline version. Other versions are pared down, relative to the baseline version.

In the embodiments illustrated, a recorded scenario 134 resides in the memory 112. Replay behaviors 206 are produced by replaying the scenario to respective versions of the application 120. Upon replaying the scenario to the full version of the application, for instance, that full version produces a scenario behavior 208, which may be viewed live and/or documented in a behavior log 136 in the system. Replaying the scenario to a pared down version of the application (which may also include bug fixes not found in the original full version) produces a candidate behavior 210, which may or may not reproduce the pertinent aspects of the full scenario behavior 208.

In the embodiments illustrated, a reduction tool 212 includes code 214 which upon execution (i) selects a particular exercised function 216, namely, a particular one of the plurality of functions 122 which was exercised during a replay of the scenario, (ii) disables execution of the particular exercised function, thereby providing a test version of the application, (iii) replays the scenario to the test version 204 of the application, thereby producing a candidate behavior log 136, (iv) compares the candidate behavior log to the scenario behavior log, and (v) when the candidate behavior log matches the scenario behavior log the reduction tool 212 removes the disabled function, thereby providing a reduced version of the application 120 which is functionally equivalent to the full version of the application with respect to the scenario yet has fewer functions than the full version of the application.

In some examples, a cached file is rewritten by extracting an ECMAScript function from the file into its own file, which is referenced by the rewritten file. For instance, a JavaScript® function may be extracted from an HTML source code file 218 into its own .js file. In some examples, the application 120 is a web application 202, and the system 102 includes a cache 220, with a locally cached HTML file 222 which corresponds to a precursor HTML file of the web application. The HTML 224 has been rewritten, such that the locally cached HTML file differs from the precursor HTML file at least in that the precursor HTML file contains a function body 226 of one of the plurality of functions, whereas the locally cached HTML file does not contain the function body but instead contains a reference 248 to another local file which contains the function body.

In some examples, the application 120 is a web application 202, and the system includes a mapping 228 between cached files 222 and dynamic uniform resource locators 140 which are functionally equivalent with respect to producing the scenario behavior log 136 from execution of the web application. The mapping 228 may be implemented using a table, tree, dictionary, collection of key-value pairs, or other suitable data structure. The mapping may be limited to content that provides functional equivalence with respect only to producing the scenario behavior log, as opposed to functional equivalence with respect to other input values or other input sequences to the application which do not occur in the scenario 134 of interest.

In some examples, the system includes an abstract syntax tree 230 which is instrumented to assist identification of application functions 216, 122 which are exercised during a replay of the scenario 134 of interest. Familiar tools, such as compiler front ends and/or parsing software, may be used to obtain the abstract syntax tree from the application's source code 218. Instrumentation may include code with sends tracking messages 232, and/or code which appends events to an execution log 234, for instance. Such instrumentation code may in particular be implemented with a tracking script 236, which is given control via a tag 238 inserted (for the purpose of tracking functions 216) in an HTML file of a web application 202.

In some examples, application code which is not exercised during a scenario replay is considered dead code 240 with respect to that scenario. When the reduction tool 212 identifies a particular unexercised function, namely, a particular one of the plurality of functions 122 which was not exercised during a replay of the scenario, the reduction code 214 automatically removes the unexercised function 240.

In some examples, a particular exercised function 216 is implemented in at least one of the following programming languages: an ECMAScript scripting language, C# (C-sharp), a Common Language Infrastructure language. Those of skill will acknowledge that JavaScript®, JScript®, and ActionScript® languages are examples of ECMAScript scripting languages (JavaScript® is a mark of Oracle America, Inc., JScript® is a mark of Microsoft Corporation, and ActionScript® is a mark of Adobe Systems, Inc.). However, ECMAScript scripting languages are not limited to these particular examples.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. In particular, some embodiments use a proxy server 242 to isolate a cached copy (possibly a modified copy) of an application from input variations that could reduce reproducibility of an issue in a scenario of interest. Mapped 228 responses are returned instead of live ones. APIs 244 whose values 246 are randomized are modified or replace so that constant values 246 are used instead.

However, an embodiment may also communicate technical data and/or technical instructions through direct memory access, removable nonvolatile media, or other information storage-retrieval and/or transmission approaches. An embodiment in a computer system may also operate without communicating with other computer systems.

Some embodiments operate in a "cloud" computing environment and/or a "cloud" storage environment in which computing services are not owned but are provided on demand. For example, application code may run on one device or system 102 in a networked cloud, mapped responses may be stored on another device within the cloud, and the pared version of the application may later run to configure the display on yet other cloud device(s)/system(s) 102.

Processes

Figure 3:
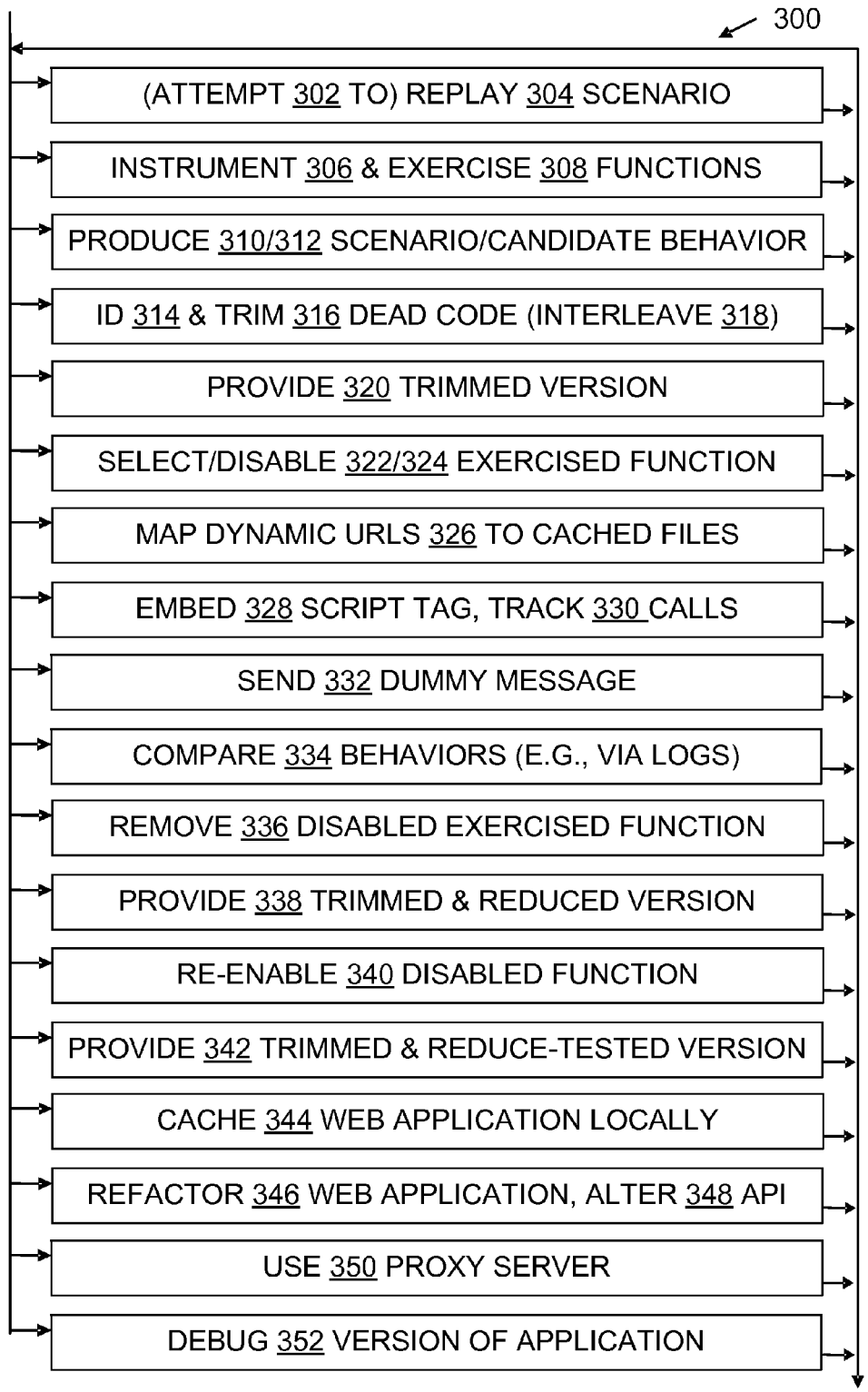
FIG. 3 is a flow chart illustrating steps of some process and configured storage medium embodiments.
Figure 4:
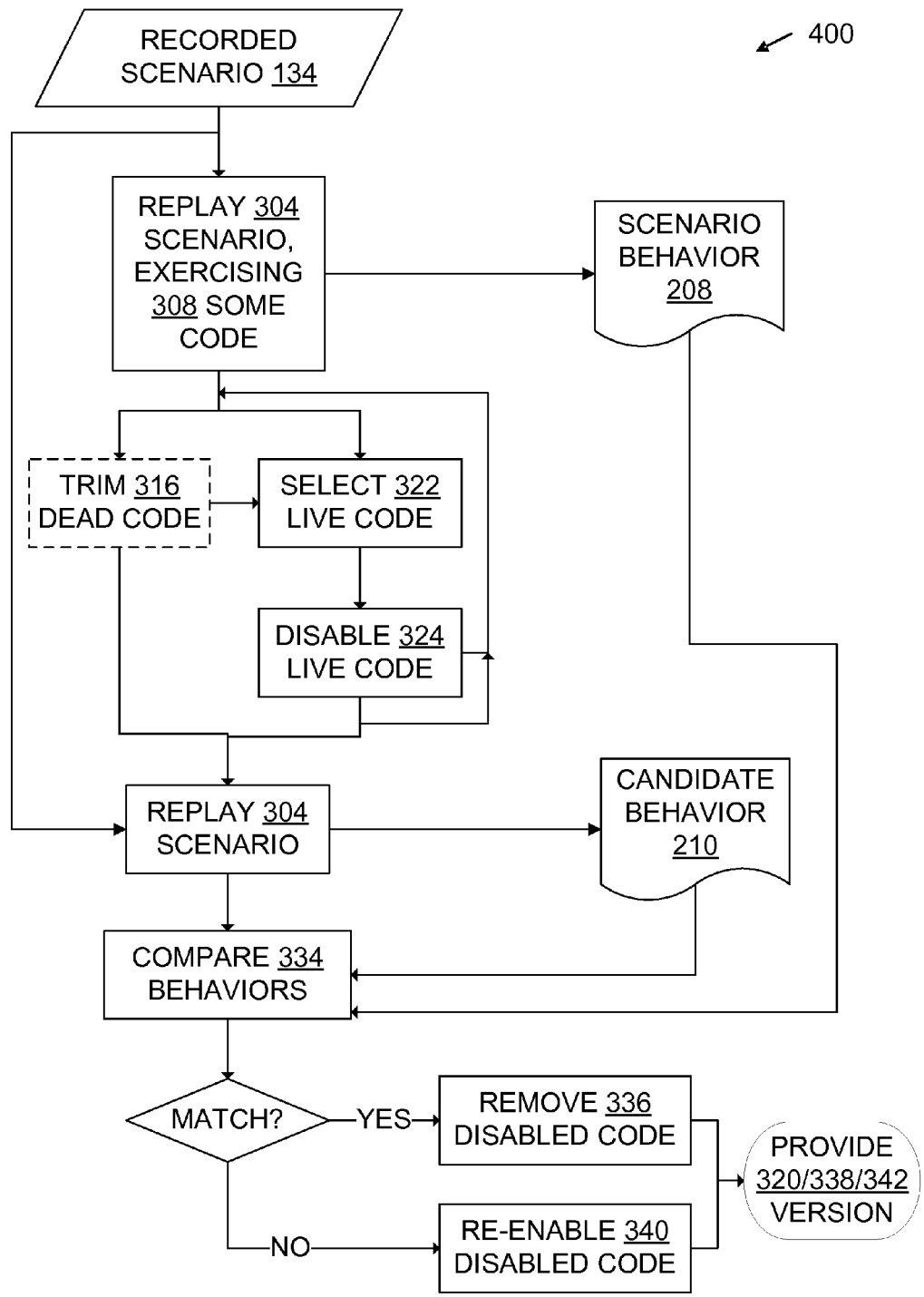
FIG. 4 is a data flow diagram illustrating aspects of code reduction and code trimming in another example.

FIG. 3 illustrates some process embodiments in a flowchart 300, and FIG. 4 illustrates process examples in a data flow diagram 400. Technical processes shown in the Figures or otherwise disclosed may be performed in some embodiments automatically, e.g., by reduction code 214 and/or other reduction tools 212 running under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 or data flow diagram 400 is traversed to indicate the steps performed during a process may vary from one performance of the process to another performance of the process. The traversal order (the order of steps) may also vary from one process embodiment to another process embodiment. Steps shown may also be omitted, combined, renamed, regrouped, or otherwise depart from the illustrated flows, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Some embodiments provide a process for trimming dead code from an application and trying to reduce application code even further by disabling other functions (even some that were exercised) which are not needed to reproduce the scenario of interest. The application is not necessarily a web application but may instead be any application, on a smartphone, laptop, tablet, workstation, computing cluster, database server, file server, or other computing system 102.

In some examples, an automated process to facilitate application debugging or testing includes (A) automatically replaying 304 a previously recorded scenario to an application that includes a plurality of functions, thereby (B) exercising 308 a subset of the application functions through their execution by at least one processor and (C) producing 310 a scenario behavior from the application. This process also includes (D) automatically trimming 316 from the application at least one dead function, namely, an application function which was not exercised during step (B), thereby (E) providing 320 a trimmed version of the application. This process also includes (F) selecting 322 an application function which was exercised 308 during step (B) and then (G) disabling 324 execution of the selected exercised function. This process also includes (H) attempting 302 to again replay 304 the previously recorded scenario to the application, but with the selected function disabled 324 even though it was exercised 308 in step (B), the replay attempt thereby (J) producing 312 a candidate behavior from the application. The behaviors are compared 334. When the step (J) candidate behavior matches the step (C) scenario behavior then the process includes (K) removing 336 the disabled function, thereby (L) providing 338 a trimmed and reduced version of the application. When the step (J) candidate behavior does not match the step (C) scenario behavior then the process includes (M) re-enabling 340 the disabled function, thereby (N) providing 342 a trimmed and reduction-tested version of the application.

Trimming 316 generally involves identifying 314 the dead code to be trimmed. This may be accomplished by comparing the remaining unpared application code to the execution log 234, and identifying any code that is in the unpared code but not in the log as dead code. Static control flow analysis tools and other familiar code coverage tools and techniques may also be used to identify 314 dead code.

Some embodiments add caching. In particular, when the application 120 includes a web application 202, some embodiments of the process cache 344 the web application locally. The replaying 304 step (A) includes replaying 304 the previously recorded scenario to the locally cached web application.

Some embodiments include rewriting HTML by extracting a JavaScript® function from HTML file into its own .js file. More generally, in some embodiments caching 344 the web application locally creates at least one cached file containing at least one of the plurality of functions, and the process further includes refactoring 346 by copying at least part of the function from the cached file into another file denoted here as file F and modifying the cached file to refer to file F.

Some embodiments use a proxy server 242, e.g., a Fiddler proxy server or the like. The proxy server 242 captures HTTP and HTTPS traffic and logs it for the developer 104 to review. The proxy server 242 also modifies traffic as taught herein to isolate the cached application and permit reproduction of the scenario issue when all relevant code of the application is still in the version being replayed. In some examples, the replaying 304 step (A) includes replaying the previously recorded scenario to the locally cached web application at least in part by using 350 a proxy server. In some, APIS 244 that inject randomness into application inputs are altered 348 to inject constant values 246 instead.

Some embodiments map 326 dynamic uniform resource locators to cached files which are functionally equivalent with respect to producing the scenario behavior from the web application. Some embed 328 a script tag 238 in a markup language file of the web application, as an instrumentation 306. The script tag identifies a script 236 which assists in tracking 330 which web application functions are exercised 308 during step (B). Some examples document 234 that a web application function was exercised 308 during step (B) at least in part by sending 332 a dummy message 232 to a website, the dummy message naming the exercised web application function, the dummy message being a message which is not produced by the web application when the web application is in a production mode rather than a debugging 352 mode.

As to examples of ways to select 322 an exercised function for possible removal, those of skill will acknowledge that each application function 122 of interest inherently has a function size, that each such application function is defined in a file 124 having contents and a file size, and that each such application function has a location in the file relative to other contents of the file. In some embodiments, the selecting step (F) includes selecting 322 the application function 216 at least in part based on at least one of the following: the function size, the file size, or the application function's location in the file. Thus, one can pick the function that is biggest in size, or the smallest in size, or pick functions from the file that is biggest/smallest in size, for instance. One SiteReduction tool implementation picks the next file in the order in which it was downloaded from the website 202 and then within that file selects 322 the next function in turn from top to bottom, starting with the function that occurs first in the file.

Some embodiments interleave 318 trimming attempts with reducing, as illustrated in particular by the looping permitted in the data flow diagram 400 around steps 316, 322, 324, but also permitted in the broader scope of flowchart 300. For instance, some embodiments try to trim 316 after every five reductions 336, but other sequences than 1:5 are used in other embodiments, such as 1:1, 1:2, 1:3, 1:4, 2:1, 3:2, 2:3, 2:2, 3:3, and so on. More generally, some process embodiments interleave 318 multiple instances of attempting the trimming 316 step (D) with multiple instances of the removing 336 step (K).

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as reduction code 214, a local cache 220 of the application 120, 202, execution log(s) 234, altered APIs 244, tracking scripts 236 and tags 238, tracking messages 232, and/or mappings 228, in the form of data 118 and instructions 116, read from a removable medium 114 and/or another source such as a network connection, to form a configured medium. The configured medium 112 is capable of causing a computer system to perform technical process steps for code trimming and/or code reduction as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

In some examples, a computer-readable storage medium 114 is configured with data 118 and with instructions 116 that when executed by at least one processor 110 causes the processor(s) to perform a technical process to facilitate debugging or testing a locally cached web application 202. Some such processes include (A) automatically replaying 304 a previously recorded scenario to the locally cached web application, the locally cached web application including a plurality of functions, thereby (B) exercising 308 a subset of the web application functions through their execution by at least one processor and (C) producing 310 a scenario behavior from the web application. The process also includes (D) automatically trimming 316 from the web application at least one dead function, namely, a web application function which was not exercised 308 (i.e., executed) during step (B), thereby (E) providing 320 a trimmed version of the web application. The process also includes (F) selecting 322 a web application function which was exercised during step (B) and then (G) disabling 324 execution of the selected exercised function. The process also includes (H) attempting 302 to again replay the previously recorded scenario to the web application, but with the selected function disabled even though it was exercised in step (B), thereby (J) producing 312 a candidate behavior from the web application. When the step (J) candidate behavior matches (as a comparison 334 result) the step (C) scenario behavior then (K) the process include removing 336 the disabled function, thereby (L) providing 338 a trimmed and reduced version of the web application for debugging. When the step (J) candidate behavior does not match the step (C) scenario behavior then the process includes (M) re-enabling 340 the disabled function, thereby (N) providing 342 a trimmed and reduction-tested version of the web application for debugging 352 or testing.

In some embodiments, the web application function has a function size, the web application function is defined in a file having contents, a file size and a website download sequence position, and the web application function has a location in the file relative to other contents of the file. In some of these, the selecting step (F) includes selecting 322 the web application function at least in part based on at least one of the following: the function size, the file size, the file's website download sequence position, or the web application function's location in the file.

In some embodiments, caching the web application locally creates at least one cached hypertext markup language (HTML) file containing a body of at least one of the plurality of functions, and the process further includes refactoring 346, namely, moving at least part of the body of the function from the cached HTML file into another file denoted here as file F, and modifying the cached HTML file to refer to file F.

In some embodiments, the process further includes debugging 352 with the trimmed and reduced version of the web application. In some, the process includes debugging 352 with the trimmed and reduction-tested version of the web application. In either case, "debugging" includes at least one of the following: single-stepping through a portion of the web application during execution of the web application, setting a breakpoint in the web application; hitting a breakpoint in the web application and then viewing a value of at least one variable before exiting the web application or resuming execution of the web application.

Different embodiments may use one or more ways to disable a function to find out whether it is needed for the scenario. In particular, sin some embodiments the step (G) of disabling 324 execution of the selected exercised function includes at least one of the following: removing the selected exercised function from the web application, commenting out at least a portion of the selected exercised function in a source code of the web application, or returning out of the selected exercised function without executing a portion of the selected exercised function that was exercised in step (B).

In some embodiments, the process includes interleaving 318 multiple instances of attempting the trimming step (D) with multiple instances of the removing step (K), and at least two instances of the removing step (K) occur between two successive attempts at trimming step (D).

In some embodiments, the process includes effectively overwriting one or more APIs that generate randomness in URLs. In some of these, the process includes altering 348 an application program interface functionality such that it generates a fixed value 246 in a dynamic universal resource locator rather than generating a randomized value 246 in the dynamic universal resource locator.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from SiteReduction (a.k.a. "Site Reduction") documentation. SiteReduction is a program implemented by Microsoft Corporation. Aspects of the SiteReduction program and/or the SiteReduction documentation are consistent with or otherwise illustrate aspects of the embodiments described herein. However, it will be understood that SiteReduction documentation and/or implementation choices do not necessarily constrain the scope of such embodiments, and likewise that SiteReduction and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

One aspect of the SiteReduction project involves caching the web application to the disk 112. This is done to permit JavaScript® code manipulation that is not feasible when the code is active on a server. In the project, the entire JavaScript® code of the web application is present on a local computer. A site reduction tool uses a proxy server (namely, the Fiddler tool) that caches the web response for every web request to the disk. Additionally it records the web request URL 140 to the corresponding response it saved to disk in a mapping table. Whenever a scenario is replayed, the proxy server looks into this mapping table 228 to respond to the request from local disk rather than getting the response over the internet. This helps the site reduction tool 212 manipulate the JavaScript® files on disk as needed and replay 304 back the scenario 134 with modified (trimmed and/or reduced) JavaScript® contents to test whether the scenario is reproducible. Many web applications 202 generate redirection web URLs 140 containing variant or random contents 246 such as current datetime or a random number. The site reduction tool 212 makes 348 these URLs pseudo-random to ensure that every recorded web request maps to its corresponding response file on the computer 102.

As to altering 348 APIs, in some implementations the tool 212 maps the dynamic URLs of website to the cached copy on the disk. To do this, the tool makes the dynamic URL "pseudo-random" as opposed to fully random, namely, sufficiently constant to prevent randomness in the URL from being the cause for a candidate behavior 210 to depart from the scenario behavior 208. For instance, foobar.com might send a request with URL http colon slash slash www dot foobar dot com/567/a.js (in this example, the address has been rendered inactive to meet patent disclosure format requirements). Here "567" can be a generated random number, so next time foobar might send the same request/response wrapped with different URL, something like http colon slash slash www dot foobar dot com/897/a.js. In order to make sure that this doesn't happen and the code 214 sees consistent URLs, in one implementation the script tag 238 also results in overwriting 348 JavaScript® APIs 244 that are a source of randomness. For instance, it overrides Math.random to return a fixed value 246. This happens before the website executes any code to generate the URL. Once the tool overwrites the random generating APIs to return fixed value, the website code that calls these APIs will get a consistent predictable value which in turn generates consistent (albeit dynamic) URLs. This facilitates the mapping 228. In example above, anytime website 202 code wants to generate the URL it will generate http colon slash slash www dot foobar dot com/567/a.js because the tool overwrote Math.random( ) to always return 567. Other examples of random generating APIs that the tool overwrites include Date, window.performance, and others readily identified by one of skill in the art.

A second aspect of the SiteReduction project involves tracking 330 JavaScript® functions that are not required for a scenario to reproduce and can be safely removed. This is done by instrumenting 306 all JavaScript® functions such that every time they execute they send 332 a proxy http request with their names. The proxy server 242 records all such requests so the tool knows which functions were executed 308 when replaying a scenario. All the functions that are not executed are dead functions 240 and can be safely removed as they are not required for the scenario. This phase may be called a "dead functions removal" phase.

After this dead functions removal phase, there may still be many functions 216 remaining in the trimmed application version that were executed in the scenario but nonetheless might not be needed for the scenario to reproduce the issue of interest. For instance, their results might impact only a portion of a webpage the scenario is not focused on. Suppose a webpage has two controls, for example, which are a list of users with their status and a button at the bottom of the page. If the button is not being displayed properly and a developer would like to focus on the minimum portion of the JavaScript® code that decides the visual aspect of the button in a button-display scenario, the tool 212 can be used to remove JavaScript® functions 216 that are formatting and displaying the users list, because that code is irrelevant to this button-display scenario 134. This can be done in a "function reduction" phase. Instrumentation assigns a unique identifier to every function 122 of the trimmed application, e.g., a hash of the function name and the name of its encapsulating module or file, or an ordinal index into a list of function names. Those identifiers are used to disable 324 one function at a time from the cached JavaScript® file and check using RnR whether disabling the function changed the behavior of the control the developer 104 is interested in for the scenario.

In this button-display scenario example, the tool 212 would check whether the button display has been changed differently than in the recorded behavior 208. If not, then the disabled function was not needed for the scenario and can be removed (or stay removed if it was disabled by being removed). If disabling the function does change the button display then the function was needed and the tool puts the function back in its own file in enabled form.

In one implementation, this phase tries every function one by one (for example; bigger groups of functions could also be disabled together) to remove unnecessary functions. The implementation also triggers "dead function removal" phase after every fifth successful removal of a function in "function reduction" phase; other ratios could also be used. Using multiple reductions per trim can speed up the overall paring process because it often happens that a function calls many functions and removing that function makes all those functions dead.

A third aspect of the SiteReduction project involves verifying that the manipulated (trimmed and/or reduced) JavaScript® code still reproduces the original scenario behavior 208. This can be done using an RnR framework that could record the original scenario and replay it back on demand for validation, e.g., in the button-display scenario for validation of the UI displayed by the web application. There are many RnR tools available, such as Microsoft's Coded UI Test (CUTF) or the Selenium® IDE (mark of Software Freedom Conservancy, Inc.). One site reduction tool implementation uses CUTF for its repetitive record and replay process. After every reduction step, this site reduction tool replays the scenario to validate by checking whether UI controls of webpage in which the developer has indicated an interest (evident in the scenario 208 behavioral content) are still unchanged.

The site reduction tool implementation connects these aspects, in the form of code 214 for caching the web application, code 214 for manipulating JavaScript® code and for using an RnR framework to trim and reduce website 202 code or perform a resource usage or other performance analysis of the application 202 code. The manipulation of JavaScript® code can be extended by those of skill in the art to other code types such as HTML (.html files) and CSS (.css files) code.

Several additional observations are now offered in question and answer form, to further illustrate examples involving site reduction.

Question: How does the system know whether the behavior with the selected function enabled matches the behavior with the selected function disabled? Answer: In one implementation, this is done as part of the CodedUITest. Before the site reduction process kicks off, the tool 212 records all the steps required to reproduce the issue. When the reduction begins (e.g., when selected functions are disabled), the recording is played back to check whether the issue can still be reproduced. If it does re-occur, then the selected disabled function(s) can indeed be discarded as not relevant to the issue. If instead the issue does not occur, then the function is required for the issue to occur and should not remain disabled.

Question: What are some of the indications that site reduction is occurring? Answer: As one indication that may be present, some site reduction tools create a mapping 228 of dynamic URLs to equivalent cached files on the disk. This may be done by creating a manifest file (.man file) that contains list of mapping entries. Each line is a comma separated entry that contains information about URL, filename, MIME type, request headers hash code. The request headers hash code is generated by combining the values of a request header and generating hashcode of the combination. If a website has two similar URLs with two different cached files, they can be distinguished by the hashcode of request header of those URLs, which will be functionally unique. That way the site reduction tool ensures that it maps the URL to right cached file. By looking at the mapping technique, one may detect usage of a similar implementation.

As another indication that may be present, some site reduction tools embed 328 a script tag such as "<script src='/sitereduction dot com/record.js'></script>" in html files (in this example tag, the address has been rendered inactive to meet patent disclosure format requirements). The script record.js is used to track 330 functions executed and eliminate randomness that occurs in some URLs.

As another possible indication of site reduction technology as taught herein, in order to record executed functions, some site reduction tools send 332 one or more fake POST messages to an URL such as/sitereduction dot com/with a list of functions 216 executed (delimited, e.g., by *SR*) appended to this URL. For instance, if two functions 216 foo and bar were executed, on their execution, the tool sends 332 a fake POST message "/sitereduction.com/foo*SR*bar". This URL is captured by the tool via Fiddler or another proxy 242 to create the list in memory so it knows which functions should not be removed.

Questions: How is JavaScript® code embedded in an HTML file processed? Answer: Some web sites (which are, or contain, web applications 202) contain a combination of JavaScript® script files that html files refer to along with embedded JavaScript® code in one or more html files themselves. Consider the following example a.html file:

```
<html>
<script src="foo.js"/>
<script>
   function bar( ){
     //bar's code body would be here
   }
</script>
</html>
```

As shown, there is JavaScript® code both in foo.js and in file a.html. One can download foo.js, instrument it and perform function reduction on it. However, doing only that would miss doing function reduction on the "bar" code that is embedded in the html file. To ensure that code 214 performs function reduction on such embedded functions (removing them if they are irrelevant to the current scenario 208), some embodiments extract out these functions into a separate file and modify the html file to refer to this file. This is denoted generally herein as "refactoring". Such refactoring does not break the functionality of websites 202 yet permits function reduction on the entire JavaScript® code that is present in the website.

In this particular example, refactoring will extract out function bar into a new file bar.js and update a.html to look like this:

```
<html>
<script src="foo.js"/>
<script src="bar.js"/>
</html>
```

As yet another possible indication that technology taught herein is present, one may compare cached html files with actual html files to see whether such refactoring has been done. If so, the technology is present.

Question: Is removing the selected function the only way to disable 324 it in order to find out whether it is needed for the scenario? Answer: Generally it is not. Other ways would be to comment the function from the code, or to return out of the function without execution of the function's body.

Question: Is instrumenting functions the only way to find out which ones are not exercised in the scenario? Answer: No, but instrumenting and then inspecting the log is often likely to be the easiest. Another way could be to check with a runtime engine/compiler whether the function was executed. But that may involve access to engine internals which are not publicly available.

Question: Could a similar process be applied to anything else, in addition to functions? Would that help debugging? Answer: It could certainly be applied to any type of web apps, and desktop or store applications too. If one has an AST or profiler or other way to instrument the code, and an ability to remove portions of the code or otherwise disable functions, then code reduction can be attempted.

Question: How is it possible that a function could be exercised by replaying a scenario yet still not be necessary for the scenario? This could be possible if the function's effects are not relevant for a scenario. For example, imagine there is a bug in a social network app showing the number of friend requests. There may still be code on the page to show a News Feed, for example, with code that executes, but that news feed code may have nothing to do with showing the right number of friend requests.

Some Additional Combinations and Variations

Any of these combinations of code, data structures, logic, components, signals, signal timings, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An automated process to facilitate application debugging or testing, including the steps of:
   (A) automatically replaying a previously recorded scenario to an application that includes a plurality of functions, thereby (B) exercising a subset of the application functions through their execution by at least one processor and (C) providing a scenario behavior from the application;
   (D) automatically trimming from the application at least one dead function, namely, an application function which was not exercised during step (B), thereby (E) providing a trimmed version of the application;
   (F) selecting an application function which was exercised during step (B) and then (G) disabling execution of the selected exercised function;
   (H) attempting to again replay the previously recorded scenario to the application, but with the selected function disabled even though it was exercised in step (B), thereby (J) providing a candidate behavior from the application;
   when the step (J) candidate behavior matches the step (C) scenario behavior then (K) removing the disabled function, thereby (L) providing a trimmed and reduced version of the application; and
   when the step (J) candidate behavior does not match the step (C) scenario behavior then (M) re-enabling the disabled function, thereby (N) providing a trimmed and reduction-tested version of the application;
   wherein the process includes interleaving multiple instances of attempting the trimming step (D) with multiple instances of the removing step (K) for which candidate behavior matches the scenario behavior.

2. The process of claim 1, wherein the application includes a web application and the process further comprises caching the web application locally, and wherein the replaying step (A) includes replaying the previously recorded scenario to the locally cached web application.

3. The process of claim 2, wherein caching the web application locally creates at least one cached file containing at least one of the plurality of functions, and the process further comprises refactoring by copying at least part of the function from the cached file into another file denoted here as file F and modifying the cached file to refer to file F.

4. The process of claim 2, wherein the replaying step (A) includes replaying the previously recorded scenario to the locally cached web application at least in part by using a proxy server.

5. The process of claim 2, comprising at least one of the following:
   mapping dynamic uniform resource locators to cached files which are functionally equivalent with respect to producing the scenario behavior from the web application;
   embedding a script tag in a markup language file of the web application, the script tag identifying a script which assists in tracking which web application functions are exercised during step (B);
   documenting that a web application function was exercised during step (B) at least in part by sending a dummy message to a website naming the exercised web application function, the dummy message being a message which is not produced by the web application when the web application is in a production mode rather than a debugging mode.

6. The process of claim 1, wherein the application function has a function size, the application function is defined in a file having contents and a file size, and the application function has a location in the file relative to other contents of the file, and the selecting step (F) includes selecting the application function at least in part based on at least one of the following: the function size, the file size, or the application function's location in the file.

7. The process of claim 1, wherein selecting an application function which was exercised during step (B) comprises obtaining an abstract syntax tree which is instrumented to assist identification of application functions which are exercised during a replay of the scenario.

8. A computer-readable storage medium configured with data and with instructions that when executed by at least one processor causes the processor(s) to perform a technical process to facilitate debugging or testing a locally cached web application, the process comprising the steps of:
   (A) automatically replaying a previously recorded scenario to the locally cached web application, the locally cached web application including a plurality of functions, thereby (B) exercising a subset of the web application functions through their execution by at least one processor and (C) producing a scenario behavior from the web application;
   (D) automatically trimming from the web application at least one dead function, namely, a web application function which was not exercised during step (B), thereby (E) providing a trimmed version of the web application;
   (F) selecting a web application function which was exercised during step (B) and then (G) disabling execution of the selected exercised function;
   (H) attempting to again replay the previously recorded scenario to the web application, but with the selected function disabled even though it was exercised in step (B), thereby (J) producing a candidate behavior from the web application;

when the step (J) candidate behavior matches the step (C) scenario behavior then (K) removing the disabled function, thereby (L) providing a trimmed and reduced version of the web application for debugging; and when the step (J) candidate behavior does not match the step (C) scenario behavior then (M) re-enabling the disabled function, thereby (N) providing a trimmed and reduction-tested version of the web application for debugging;

wherein the process includes interleaving multiple instances of attempting the trimming step (D) with multiple instances of the removing step (K) for which candidate behavior matches the scenario behavior.

9. The storage medium of claim 8, wherein the web application function has a function size, the web application function is defined in a file having contents, a file size and a website download sequence position, and the web application function has a location in the file relative to other contents of the file, and the selecting step (F) includes selecting the web application function at least in part based on at least one of the following: the function size, the file size, the file's website download sequence position, or the web application function's location in the file.

10. The storage medium of claim 8, wherein caching the web application locally creates at least one cached hypertext markup language (HTML) file containing a body of at least one of the plurality of functions, and the process further comprises moving at least part of the body of the function from the cached HTML file into another file denoted here as file F, and modifying the cached HTML file to refer to file F.

11. The storage medium of claim 8, wherein the process further comprises at least one of the following:
debugging with the trimmed and reduced version of the web application;
debugging with the trimmed and reduction-tested version of the web application;
wherein debugging includes at least one of the following: single-stepping through a portion of the web application during execution of the web application, setting a breakpoint in the web application; hitting a breakpoint in the web application and then viewing a value of at least one variable before exiting the web application or resuming execution of the web application.

12. The storage medium of claim 8, wherein the step (G) of disabling execution of the selected exercised function includes at least one of the following: removing the selected exercised function from the web application, commenting out at least a portion of the selected exercised function in a source code of the web application, or returning out of the selected exercised function without executing a portion of the selected exercised function that was exercised in step (B).

13. The storage medium of claim 8, wherein at least two instances of the removing step (K) occur between two successive attempts at trimming step (D).

14. The storage medium of claim 8, further comprising altering an application program interface functionality such that it generates a fixed value in a dynamic universal resource locator rather than generating a randomized value in the dynamic universal resource locator.

15. A computer system comprising:
a logical processor;
a memory in operable communication with the logical processor;
an application residing in the memory and having a plurality of functions, the application having a full version;
a recorded scenario residing in the memory which upon replay to the full version of the application provides a scenario behavior log in the system;
a reduction tool which upon execution (i) selects a particular exercised function, namely, a particular one of the plurality of functions which was exercised during a replay of the scenario, (ii) disables execution of the particular exercised function, thereby providing a test version of the application, (iii) replays the scenario to the test version of the application, thereby providing a candidate behavior log, (iv) compares the candidate behavior log to the scenario behavior log, and (v) when the candidate behavior log matches the scenario behavior log the reduction tool removes the disabled function, thereby providing a reduced version of the application which is functionally equivalent to the full version of the application with respect to the scenario yet has fewer functions than the full version of the application, and (vii) interleaves multiple instances of trimming dead code from the application, dead code being code which was not exercised during replaying step (iii), with multiple instances of a sequence that includes disabling an exercised function, replaying the scenario, and comparing logs in an attempt to provide a further reduced version of the application.

16. The system of claim 15, wherein the application is a web application, and the system further comprises a locally cached HTML file which corresponds to a precursor HTML file of the web application, and the locally cached HTML file differs from the precursor HTML file at least in that the precursor HTML file contains a function body of one of the plurality of functions, whereas the locally cached HTML file does not contain the function body but instead contains a reference to another local file which contains the function body.

17. The system of claim 15, wherein the application is a web application, and the system further comprises a mapping between cached files and dynamic uniform resource locators which are functionally equivalent with respect to producing the scenario behavior log from execution of the web application.

18. The system of claim 15, further comprising an abstract syntax tree which is instrumented to assist identification of application functions which are exercised during a replay of the scenario.

19. The system of claim 15, wherein the reduction tool upon execution also identifies a particular unexercised function, namely, a particular one of the plurality of functions which was not exercised during a replay of the scenario, and automatically removes the unexercised function.

20. The system of claim 15, wherein the particular exercised function is implemented in at least one of the following programming languages: an ECMAScript scripting language, C# (C-sharp), a Common Language Infrastructure language.

* * * * *